(12) United States Patent
Vicat-Blanc Primet et al.

(10) Patent No.: US 8,775,616 B2
(45) Date of Patent: Jul. 8, 2014

(54) DIAGNOSTIC TOOL FOR BROADBAND NETWORKS

(75) Inventors: Pascale Vicat-Blanc Primet, Lyons (FR); Romaric Guillier, Lyons (FR)

(73) Assignee: Infria Institut National de Recherche en Informatique et en Automatique, Le Chesnay (FR)

( * ) Notice: Subject to any disclaimer, the term of this patent is extended or adjusted under 35 U.S.C. 154(b) by 214 days.

(21) Appl. No.: 13/508,240

(22) PCT Filed: Nov. 4, 2010

(86) PCT No.: PCT/FR2010/052372
§ 371 (c)(1),
(2), (4) Date: Jul. 13, 2012

(87) PCT Pub. No.: WO2011/055086
PCT Pub. Date: May 12, 2011

(65) Prior Publication Data
US 2012/0284396 A1     Nov. 8, 2012

(30) Foreign Application Priority Data
Nov. 4, 2009 (FR) ...................................... 09 05285

(51) Int. Cl.
G06F 15/16     (2006.01)
(52) U.S. Cl.
USPC ............ 709/224; 370/229; 370/230; 398/358
(58) Field of Classification Search
CPC ..... H04L 47/10; H04L 47/25; H04L 12/2602; H04L 41/147
USPC .................................. 709/224; 370/229, 230
See application file for complete search history.

(56) References Cited

U.S. PATENT DOCUMENTS

| | | | | |
|---|---|---|---|---|
| 5,719,962 A * | 2/1998 | Sugahara et al. | ............. | 382/239 |
| 5,966,057 A * | 10/1999 | Kintis et al. | .................. | 333/109 |
| 7,777,628 B2 * | 8/2010 | Tilson, Jr. | .................. | 340/572.1 |
| 8,068,731 B2 * | 11/2011 | Peng et al. | ....................... | 398/58 |
| 2003/0226067 A1 * | 12/2003 | Anonson | ........................ | 714/46 |
| 2009/0052426 A1 * | 2/2009 | Perraud | ............................ | 370/338 |
| 2009/0086802 A1 * | 4/2009 | Nabetani | ........................ | 375/225 |
| 2010/0103817 A1 * | 4/2010 | Takayanagi et al. | .......... | 370/230 |
| 2010/0254707 A1 * | 10/2010 | Peng et al. | ....................... | 398/58 |
| 2011/0044258 A1 * | 2/2011 | Nezou | ............................ | 370/329 |

FOREIGN PATENT DOCUMENTS

FR     2913838 A1     9/2008

* cited by examiner

*Primary Examiner* — Tesfay Yohannes
(74) *Attorney, Agent, or Firm* — McDermott Will & Emery LLP

(57) ABSTRACT

A local pre-transfer agent, that can be run on a local computer including RAM, one central processing unit, and one interface communicating with a data exchange network connected to the RAM by a communication bus. The agent includes a first function establishing a first predictive value of the data transmission or reception bandwidth limit from configuration data on the memory, a second function establishing a second predictive value of bandwidth limit from configuration data of the processing unit, a third function establishing a third predictive value of bandwidth limit from bus configuration data, a fourth function establishing a fourth predictive value of bandwidth limit from configuration data of the communication interface, and a hardware diagnostic function invoking each one these functions and establishing, from the resulting predictive values, a bandwidth reference value in accordance with predefined comparison rules for said predictive values.

13 Claims, 14 Drawing Sheets

DIAGNOSTIC TOOL FOR BROADBAND NETWORKS

CROSS REFERENCE TO PRIOR APPLICATIONS

This application is a U.S. National Phase application under 35 U.S.C. §371 of International Application No. PCT/FR2010/052372, filed on Nov. 4, 2010 and claims benefit of priority to French Patent Application No. 09 05285, filed on Nov. 4, 2009. The International Application was published in French on May 12, 2011 as WO 2011/055086 A1 under PCT Article 21(2). All of these applications are herein incorporated by reference.

FIELD OF THE INVENTION

The invention relates to a computer tool for use in data exchange networks, in particular with a very high bandwidth.

BACKGROUND

For information on this subject, reference may for example be made to document FR A 2 913 838, which describes a dynamic control method for controlling the number of data flows passing through a network architecture.

Computer networks are used first and foremost to exchange data between computers. These networks have developed considerably in recent years. An ever-increasing amount of data is exchanged each day using such networks.

When data needs to be transferred, from one person to another, one location to another, or one machine to another, for example, the use of a computer network is increasingly preferred to other types of exchanges, for example the physical transmission of the memory medium, such as a compact disc.

Owing to the increase in hardware processing and storage capacities, it has become possible to transmit larger quantities of data over these networks. It has been observed that the quantity of data exchanged during a same transfer has increased considerably in recent years, and will probably continue to do so. Today, a transfer may concern a significant amount of data, in the vicinity of one hundred megabytes or even a gigabyte.

The significance, in quantity, of a data transfer is usually assessed as a function of the theoretical performance of the network in terms of bandwidth, as well as the time the user anticipates will be necessary to perform the transfer.

Network performance is traditionally compared to the performance of the hardware making up the network connection(s). For a purely local network, for example, these are the network cards of the concerned computers, the switch/router used, and the cables. Furthermore, specifications exist for this hardware, which determine its maximum operating bandwidth. Thus for example, there are "Fast Ethernet" network cards, i.e. capable of reaching a bandwidth of 100 Mb/s, or "Gigabit Ethernet" cards capable of reaching a bandwidth of 1 Gb/s. For a network extending at least partially over the Internet, it is the Internet connection bandwidth that will generally be considered, for example between 20 and 30 Mb/s for general public ADSL connections or 100 Mb/s for fiber optic connections.

The development of computer networks has been accompanied by an increase in the performance of the available network equipment, in particular relative to the bandwidth.

An increase in the performance level of data transfers by networks, resulting from the improvements to the equipment, was therefore expected.

However, in practice, although such a performance gain has in fact been observed, it has nevertheless remained much lower than the anticipated bandwidths, even taking into account that for this new equipment, as for the older equipment, the theoretical bandwidths are only achieved exceptionally.

In other words, the transition from a traditional infrastructure to a very high bandwidth infrastructure today does not make it possible to obtain the expected throughput values for users.

The Applicant intends to improve the situation.

SUMMARY

The proposed tool includes a local pre-transfer agent, that can be run on a local computer comprising random-access memory, one or more central processing units, and one or more communication interface for communicating with a data exchange network and which are connected to the random-access memory by means of a communication bus, said agent including a first function adapted to establish a first predictive value of data transmission or reception bandwidth limit from configuration data in the memory, a second function adapted to establish a second predictive value of data transmission or reception bandwidth limit from hardware configuration data relative to the processing units, a third function adapted to establish a third predictive value of the data transmission or reception bandwidth limit from hardware configuration data relative to the communication bus, a fourth function adapted to establish a fourth predictive value of the data transmission or reception bandwidth limit from hardware configuration data relative to the communication interface, and a hardware diagnostic function adapted to invoke each one of said first, second, third and fourth functions and to establish, from the resulting first, second, third and fourth predictive bandwidth limit values, a bandwidth reference value for data transmission or reception, in accordance with predefined comparison rules for said predictive values, the local agent being arranged so as, upon prior call for data transfer, to launch the hardware diagnostic function and return said data transmission or reception bandwidth reference value as a quantity of interest in connection with at least one other data transmission/reception bandwidth quantity. The local agent makes it possible to obtain a bandwidth reference value that characterizes the performance of all of the hardware elements operating during a data exchange through a network.

The Applicant has observed that the reference value thus established effectively characterizes a bottleneck related to the hardware elements of the computers involved in a data exchange over a network. This reference value is such that it is relevant to compare it to other available bandwidth reference values, relative to other elements operative during a data transfer.

This reference value is established taking into account the importance of the material elements in a data transfer operation, which calls other elements into play, such as software or network elements.

The manner in which this reference value is established is extremely important: a value below the actual bandwidth performance of the hardware would lead one to consider that the equipment is still limiting the transfer performance levels, which may be inaccurate. On the contrary, a value higher than the actual performance levels would definitively exonerate the equipment, which may also be incorrect, in particular for very high-bandwidth networks.

Here, the reference value is accurate, while remaining predictive. This reference value is in fact established before the data transfers.

To establish this reference value, the Applicant first managed to identify all of the hardware elements of a nature to limit the transfer bandwidth performance, and only those elements.

The identification of these hardware elements is also extremely important: taking into account a piece of hardware that in fact is inoperative may influence the established reference value, and in particular erroneously limit it. On the other hand, not taking an operative element into account leads to an erroneous reference value, which also may not be relevantly compared to other bandwidth values.

Each of the predictive data transmission/reception bandwidth values is established such that it can be relevantly compared to the other predictive bandwidth values.

The reference value is particularly interesting in as much as it may serve as a basis for later operations to optimize the data transfer conditions. Thus, for example, any optimization operation intended to increase an actual bandwidth to a value above the reference value is shown in advance to be pointless. Said optimization operation may nevertheless be carried out with the aim of achieving an actual bandwidth close to the reference value. In this way, the local agent may advantageously be invoked before any transfer bandwidth optimization operation.

BRIEF DESCRIPTION OF THE DRAWINGS

Other features and advantages of the invention will appear in light of the following detailed description, and the appended drawings, in which.

Furthermore:

annex 1 shows formulas used in the hardware configuration function, annex 2 shows formulas used in the software configuration function, and annex 3 shows data for the hardware configuration function.

DETAILED DESCRIPTION

The drawings and annexes to the description is essentially contain elements of a definite nature. They may therefore be used not only to better understand the description, but also to contribute to the definition of the invention, if applicable.

Figure 1:
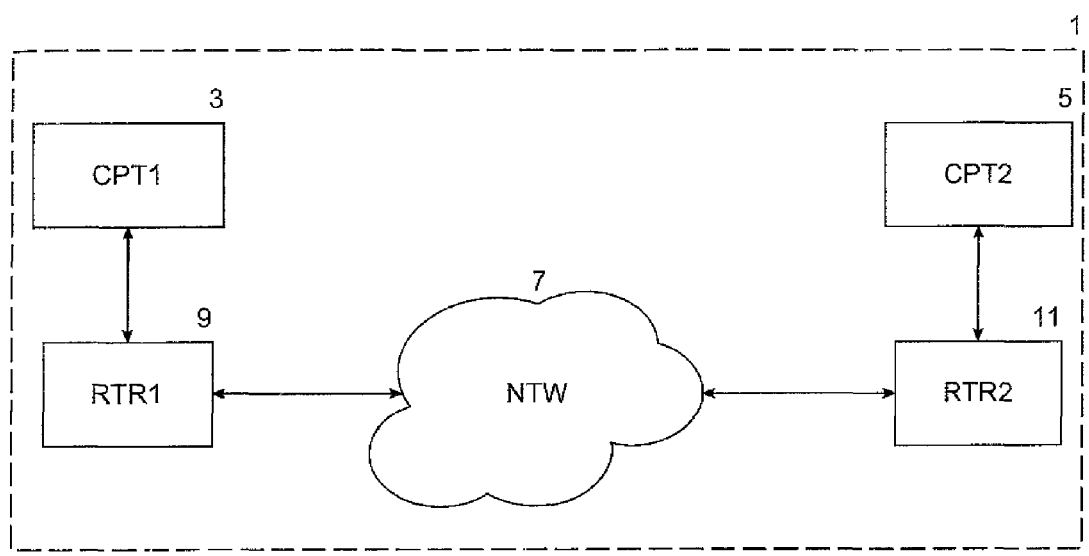
FIG. 1 shows a diagram of a computer facility.

FIG. 1 shows a computer facility 1 including a first computer device in the form of a first computer 3 and a second computer device, in the form of a second computer 5.

The first computer 3 and the second computer 5 may assume very different forms, such as a personal computer, workstation, application server, file server, Internet server, or others.

The first computer 3 is connected to an access point in a data exchange network 7. This access point here assumes the form of a first router 9.

The second computer 5 is connected to this data exchange network 7 by an access point, here are a second router 11.

The first router 9 and/or the second router 11 can also perform a complementary signal modulation/demodulation function, i.e. can also function as a modem.

The first computer 3 and the second computer 5 are capable of exchanging data with one another by means of the network 7.

Here, the data exchange network 7 operates according to the TCP/IP protocol, as defined in standards RFC 791 (for the IP protocol), RFC 793 (for the TCP protocol) and their evolutions, defined by the IETF (Internet Engineering Task Force). Other transport/network protocols can be considered, in particular based on a data exchange by packets.

The network 7 can assume the form of a virtual private network (VPN), within an institution for example, or can be at least partially public, like the Internet. The network 7 can be of the local area network (LAN) type or the wide area network (WAN) type.

The embodiments of the first computer equipment and the second computer equipment are not limited to the first computer 3 and second computer 5, but can comprise all devices capable of processing computer data provided with software and hardware means for exchanging files through the network 7.

Figure 2:
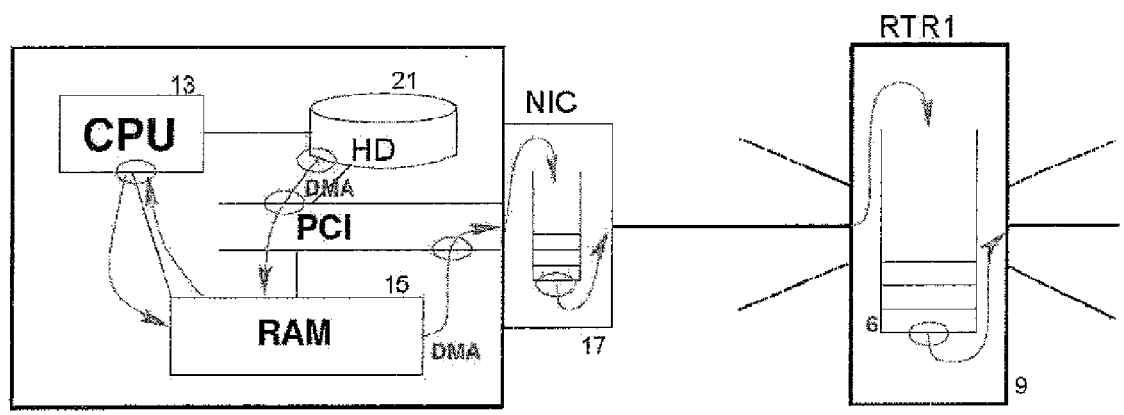
FIG. 2 shows a diagram illustrating the hardware elements of a computer of the facility of FIG. 1.
Figure 3:
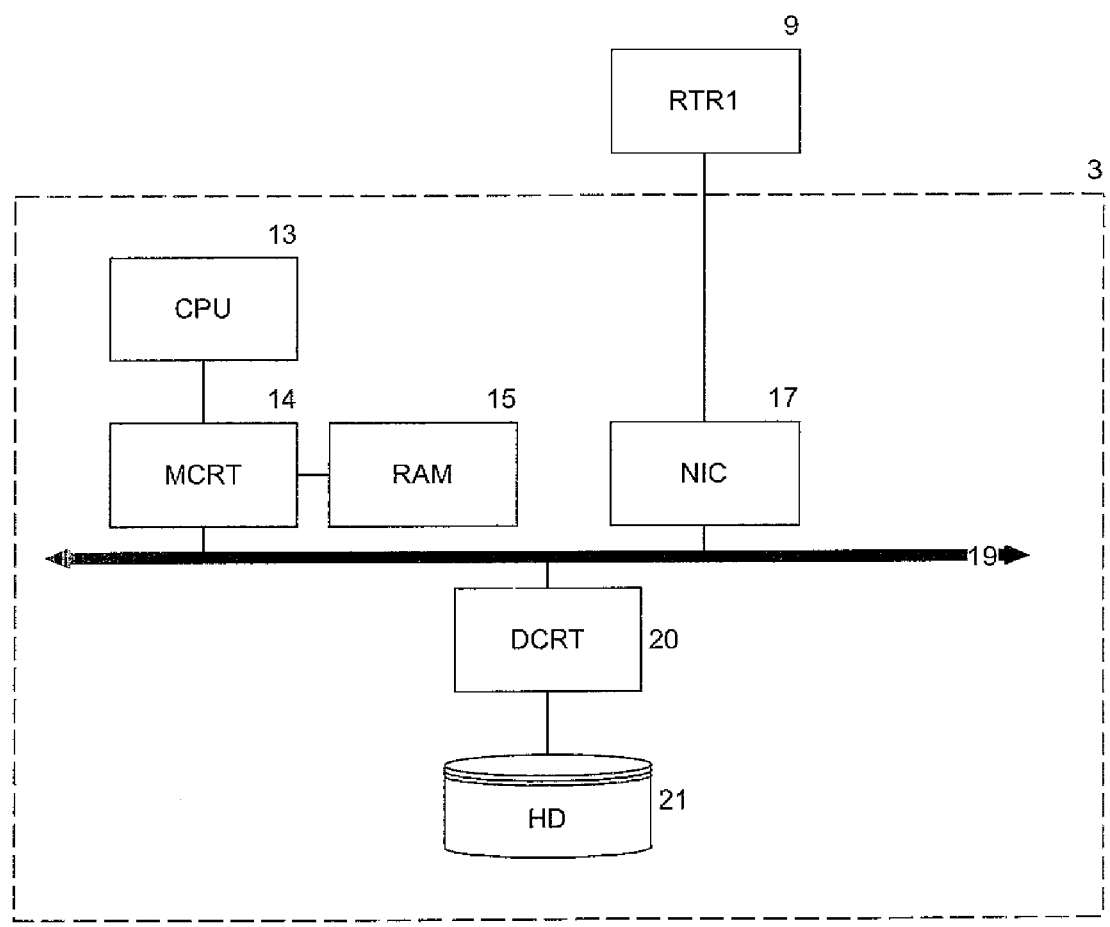
FIG. 3 shows a diagram illustrating the hardware elements of a computer of the facility of FIG. 1, in a different representation from that of FIG. 2.

FIGS. 2 and 3 outline the hardware of the first computer 3 that are operative during a data exchange using the network 7.

The first computer 3 includes one or more computation units 13, such as microprocessors, for example, connected with the possibility of data exchanges to random access memory (RAM) 15, using an MCRT memory controller 14. The CPUs 13, the MCRT controller 14, and the RAM 15 are connected to one another by data exchange channels, or memory buses.

The first computer 3 also comprises a network interface controller, or NIC 17. Here, the NIC 17 assumes the form of an Ethernet network card, i.e. meeting standard IEEE 802.3 or ISO/IEC 8802-3. Although the invention is particularly interesting for computers equipped with very high-bandwidth cards, such as Fast Ethernet, Gigabit Ethernet, or 10G Ethernet cards, it is still advantageous in the case of lower-capacity cards, for example "Ethernet 10 Mbps."

Other types of network interface controllers can be considered, for example a network card of the "Myrinet" type, i.e. according to standard ANSI/VITA 26-1998.

The NIC 17 may be physically integrated into the motherboard of the computer.

The NIC 17 is connected to the RAM 15 by means of the data exchange bus, here of the PCI or PCI bus type 19. In fact, the MRCT controller 14 is connected to the PCI bus 19.

The network interface controller 17 is connected to the first router 9 by means of a data transmission medium, such as a network cable, a wireless transmission link, for example of the Wi-Fi or Bluetooth type, a fiber-optic segment, or others.

The first computer 3 also includes one or more permanent data storage devices, or HD disks 21, optional, capable of data exchanges with the RAM 15 by means of the PCI bus 19. More specifically, the HD disks 21 are connected to the PCI bus 19 by means of one or more disk controllers, or DCRT controllers 20. Typically, the HD disks 21 assume the form of hard drives.

Although it is not shown in FIG. 3, the MCRT controller 14, the RAM 15, the NIC interface 17, the DCRT controllers 20, and the HD disks 21 are respectively connected to the CPUs 13 with the possibility of electric signal exchanges, in particular for synchronization of the operations between those material elements.

The data transfer from one of the disks 21 of the first computer 1 to one of the HD disks 21 of the second computer 5 includes transferring that data to the router 9. This last transfer takes place as follows:

a. The data to be transferred, contained in an HD disk 21, is copied into the RAM 15 by means of the PCI bus 19.
b. This data is transmitted from the RAM 15 to the CPU 13 for one or more processing operations, including the division of that data to be transferred into data packets of a predefined size.
c. These data packets are progressively copied into a transmission queue maintained in the RAM 15.
d. The data packets in that transmission queue are progressively copied into an emission queue of the NIC 17.
e. The data packets of the last emission queue are sent to the first router 9.
f. The packets are progressively taken over by the first router 9, after possibly waiting in a queue maintained in that router.

The second computer 5 includes a hardware structure, not shown, similar to that described above relative to the first computer 3.

The transfer of data from one of the disks 21 of the first computer 1 to one of the disks 21 of the second computer 5 includes the reception of data from the network 7 at the disk 21 of the second computer 5. This reception occurs as follows:

a. Data packets are progressively received at the second router 11 and potentially stored in a queue of that router.
b. The data packets of the second router 11 are progressively received in a reception queue of the NIC 17 of the second computer 5.
c. These data packets are progressively copied from the queue of the NIC 17 into a reception queue maintained in the RAM 15.
d. The data packets of the reception queue are transmitted to the CPU 13 for one or more processing operations, including an assembly of data packets.
e. The assembled data is sent to the RAM 15.
f. This assembled data is copied onto the disk 21.

Figure 4:
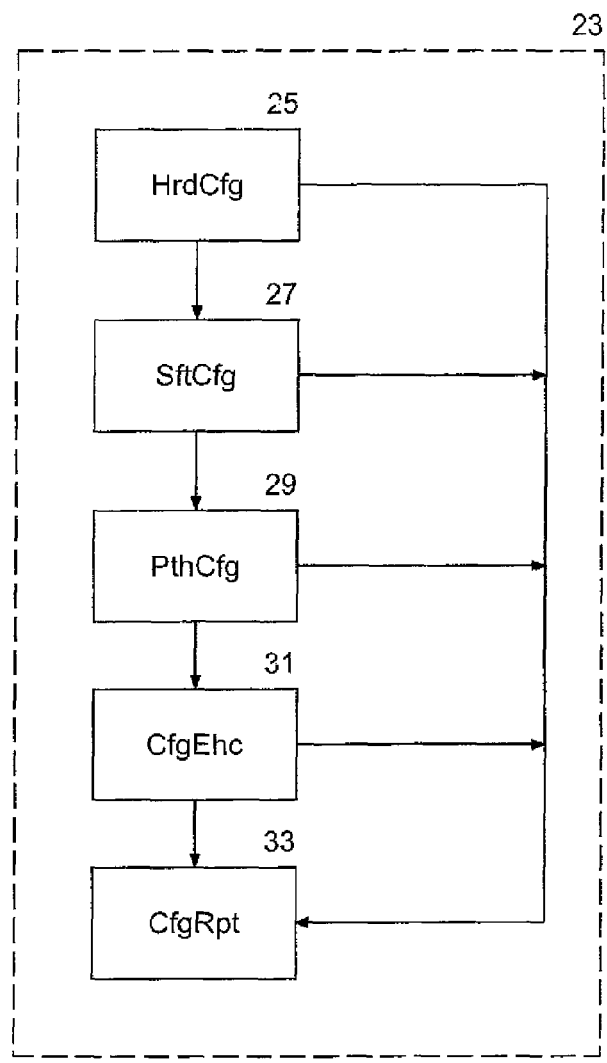
FIG. 4 shows a flowchart illustrating the operation of the local configuration agent that can be run on a computer of the facility of FIG. 1.

Each of the first computer 3 and the second computer 5 runs a configuration tool 23, or agent, illustrated in FIG. 4.

The first computer 3, here source computer, will emit a quantity of computer data intended for the second computer 5, here recipient computer. For each of the first computer 3 and the second computer 5, the configuration tool 23 run on the computer in question forms a local configuration agent, while the configuration tool 23 run on the other of these computers forms a remote configuration agent.

The configuration agent 23 includes the following functions:

a hardware configuration function, or HrdCfg function 25, adapted to establish a first predictive value of the transmission or reception bandwidth limit, from intrinsic characteristics and the configuration of component hardware elements of the first computer 3, a software configuration function, or SftCfg 27, adapted to establish a second predictive value of the transmission/reception bandwidth limit, from configuration data of the software elements of the local computer, a network configuration function, or PthCfg 29, adapted to establish a third predictive value of the transmission/reception bandwidth limit, from characteristic data of the network connection 7 between the first computer 3 and the second computer 5, an optimization function, or CfgEhc function 31, optional, adapted to offer the user one or more modifications of the software, hardware, and/or network path configurations so as to increase the transmission/reception bandwidth limit values, and a reporting function, or CfgRpt 33, adapted to report the results of the call for the HrdCfg 25, SftCfg 27 and PthCfg 29 functions in a form that is comprehensible for the user.

Advantageously, the configuration agent 23 is arranged to run, when invoked, all of the above functions, successively and in the order in which they are listed. This does not rule out that some of these functions may not be called upon and/or not implemented in the configuration agent 23, for example because they relate to an element of the data transfer which it is known cannot, in any way, limit the predictive values of the bandwidth limit.

Here, the configuration tool 23 is also arranged to receive, as parameters:

an identifier src of the machine from which the data transfer must take place, or source machine. This identifier src may for example assume the form of a chain of characters representing a name of the computer on the network ("hostname") or a so-called "IP" address. By default, the source of this transfer is the computer on which the configuration agent is run, and the identifier src then assumes the value "localhost."

an identifier dst of the destination machine on which the data transfer is to take place, or recipient machine. This identifier may assume the form of a chain of characters identifying the computer in question on the network, for example in the form of a chain of characters or an IP address.

an order of magnitude value V indicative of an order of magnitude of the volume of data to be transferred from the source computer to the recipient computer.

The configuration agent 23 can be arranged to receive optional parameter values. For example, the configuration agent 23 can receive an actual transfer time value RTT (Round-Trip Time) indicating the time necessary for a data packet to perform a round-trip on the network, i.e. to go from the NIC interface 17 of the source computer to the NIC interface 17 of the recipient computer and return to the source computer. The configuration agent can also receive a target bandwidth value T that the user wishes to achieve for later data transfers.

Figure 5:
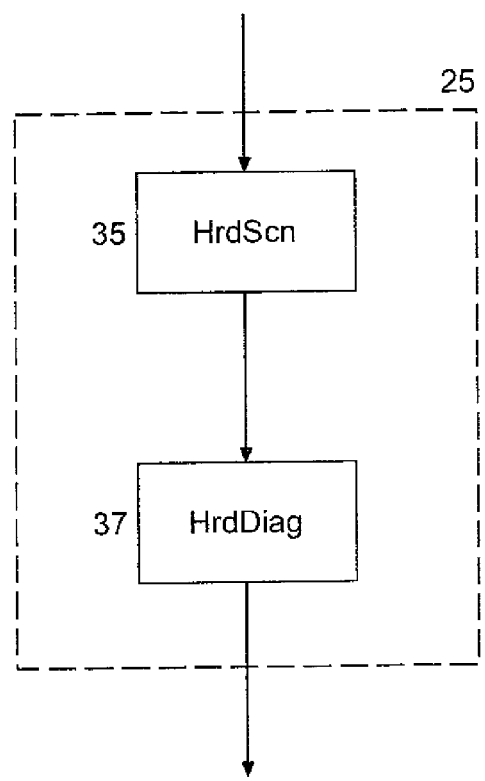
FIG. 5 shows a flowchart illustrating the operation of a hardware configuration function of the local agent of FIG. 4.

Reference is made to FIG. 5.

The HrdCfg function 25 is arranged to invoke a hardware inspection function, or HrdScn function 35, adapted to recover the values of the set of parameters that are characteristic of the hardware configuration of the local host computer, then a HrdDiag hardware diagnostic function 37, adapted to establish a first value Rhardware of the transmission/reception bandwidth limit from the set of parameters established by the HrdScn function 35.

Figure 6:
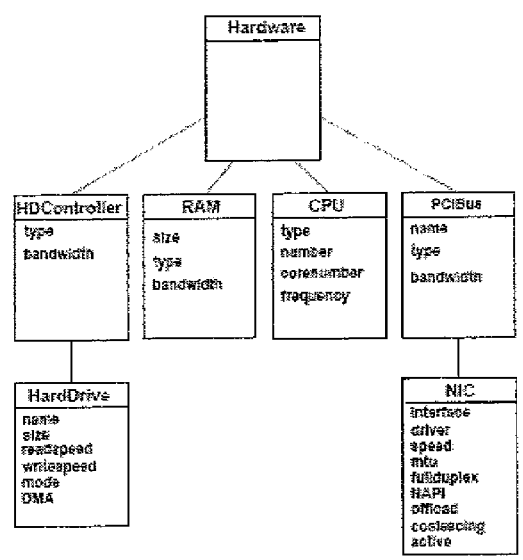
FIG. 6 shows a diagram of a hardware configuration object.

FIG. 6 shows one advantageous illustration of the set of parameters in question, in the form of a computer object of the hardware configuration type, or 'hardwareconfig' object.

A 'hardwareConfig' object has a tree structure including a disk node, or 'HDController', bringing together the parameters related to the operation of the hard drive controller(s) 21, a 'RAM' memory node, or processing units, or bringing together the parameters related to the operation of the RAM 15, a 'CPU' node bringing together the parameters related to the operation of the CPUs 13 and a node, bus, or 'PCIBus' bringing together the parameters related to the operation of the PCI bus 19.

A 'hardwareconfig' object includes a 'HDController' branch for each of the hard drive controllers 21 present in the local host computer.

Each 'HDController' branch includes a 'type' input characterizing the type of controller considered, and a 'bandwidth' input characterizing the theoretical bandwidth of that controller, i.e. the quantity of data that can pass through the controller per unit of time, and a 'HardDrive' node bringing together the parameters related to the operation of the hard drive(s) 21 attached to the considered controller.

The 'type' input may for example be associated with a chain of characters identifying one of the SATA ("Serial Advanced Technology Attachment"), SCSI ("Small Computer System Interface"), PATA ("Parallel Advanced Technology Attachment") standards. Other values may exist, in particular as a function of future technological evolutions on these types of computer components.

Each 'HDController' branch includes a 'HardDrive' branch for each of the hard drives 21 attached to the controller in question.

Each 'HardDrive' branch includes a 'name' input identifying the hard drive in question, a 'size' input characterizing the data storage capacity of the drive, a 'readspeed' input characterizing a reading speed of the drive (quantity of data that can be read per unit of time), a 'writespeed' input characterizing a writing speed of the drive (quantity of data that can be written per unit of time), a 'mode' input characterizing a standardized operating mode of the drive, and a Boolean 'DMA' input indicating whether the hard drive is operating according to the DMA (direct access memory) method. According to the DMA method, the data transmitted by a peripheral, such as a communication port or hard drive, or received by the latter, is transferred directly by an adapted controller to the RAM of the computer, without intervention by the CPUs other than to initiate and conclude said transfer.

The operating modes of the hard drives currently commonly used, i.e. on serially assembled computers, include the PIO, DMA, UDMA or SATA modes.

Each 'RAM' branch includes a 'size' input characterizing the data storage capacity of the RAM 15 of the local host computer, a 'type' input characterizing the type of that RAM 15, and a 'bandwidth' input characterizing the theoretical bandwidth of the RAM 15.

A 'CPU' branch includes a 'number' input indicating the number of CPUs 13 physically installed inside the local host computer and, for each of said CPUs 13, a 'type' input characterizing the type of that unit, a 'corenumber' input indicating the number of its cores. The 'CPU' branch also includes a 'frequency' input indicating the operating frequency shared by all of these CPUs 13.

A 'hardwareconfig' object includes at least one 'PCIBus' branch, relative to a PCI bus 19, which has a 'NIC' node bringing together the parameter values related to the operation of the NIC(s) 17 attached to the considered bus.

The local host computer can include several PCI buses 19, in particular of different types. The 'hardwareconfig' object may then include a branch for each of said buses. In practice, it is possible to limit the 'PCIBus' branches only to the buses to which at least one NIC is connected.

The local host computer may include several NICs 17, for example connected to access points of the different networks, or coupled to improve the transmission/reception performance. The 'hardwareconfig' object may bring together the inputs relative to each of said NICs 17. However, it is also possible to keep only the inputs of the controllers concerned by the considered transmission or to keep only the input corresponding to the highest performing of said NICs 17 so as to simplify the production of the configuration tool 23.

Each 'PCIBus' branch includes a 'name' input identifying the PCI bus 19 considered, and a 'type' input characterizing the type of said PCI bus 19, and a 'bandwidth' input indicating the bandwidth of the bus in question.

Currently, the 'type' input of the 'PCIBus' branch may be associated with a chain of characters identifying one of the PCI, PCI-X or PCI-Express (PCI-E) standards. Other standards may exist, in particular as a function of future technological developments on these computer components.

Each 'NIC' branch relative to a NIC 17 includes an 'interface' input identifying the network interface used by the controller (for example, Ethernet or Gigabit), a 'driver' input identifying the driver used for that controller, a 'speed' input indicating a theoretical transmission speed of said controller, i.e. a transmission bandwidth value as negotiated between the NIC 17 in question and the first router to which that interface is connected (here, the first router 9), a 'MTU' input indicating the maximum size in bytes of the data packet that may be transmitted at one time (MTU for "Maximum Transmission Unit," value negotiated between the NIC and the switch/router to which the NIC is connected), a Boolean 'fullduplex' input indicating whether the controller is capable of simultaneously transmitting and receiving data, a Boolean 'NAPI' input indicating whether the kernel of the operating system has a NAPI interface (operating mode in which the CPU/network card exchanges are done at regular intervals rather than by interrupts, i.e. rather than using interruption requests). This API is currently limited to GNU/Linux kernels, but other operating systems may have similar interfaces), a Boolean 'offload' input, which indicates a configuration in which certain operations, such as the fragmentation of the data packets, the computation of the integrity of those packets or "checksum," are done by the interface in question and not by the CPUs, a Boolean 'coalescing' input, indicating whether the NIC interface 17 has the functionality of generating an interruption requesting the processing of the received data packets once that interface has received a given number of packets or a given length of time has expired, and an 'active' input indicating whether the considered controller is activated in the configuration of the considered host computer.

Figure 7:
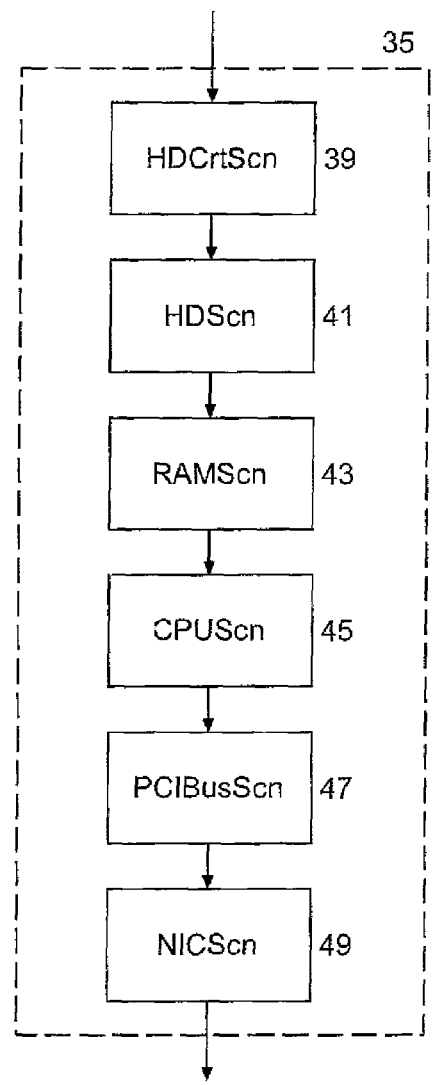
FIG. 7 shows a flowchart illustrating the operation of a hardware inspection function for the hardware configuration function of FIG. 5.

Reference is made to FIG. 7.

The HrdScn function 35 is arranged to receive an object of the 'hardwareconfig' type as input and to deliver an object of the 'hardwareconfig' type having inputs entered as output.

The HrdScn function 35 may invoke an inspection sub-function of disk controllers, or HDCrtScn function 39, adapted to enter the inputs of the 'HDController' branches. The HDCrtScn function 39 is for example arranged to invoke a "dbus" communication bus system [http://www.freedesktop.org/wiki/dbus], operating under the GNU/Linux operating system, capable of returning a description of the hardware elements making up the computer, which makes it possible to enter said inputs.

The HrdScn function 35 may invoke a disk inspection sub-function, or HDScn function 41, adapted to enter the inputs of each 'Harddrive' branch of the 'hardwareconfig' object. This HDScn function 41 is for example arranged to invoke the "hdparm" program [http://sourceforge.net/projetcs/hdparm/], operating under the GNU/Linux operating system, and capable of returning the necessary information to enter said inputs. The HDScn function 41 is then arranged to invoke the test function, or "benchmarking" function, of that "hdparm" program, and with the "Bufferedread" option.

Similar computer tools can also be used, as a supplement or replacement for "hdparm." If applicable, the values of the write and read speeds of the drive may correspond to an average value of each of the values returned by the different diagnostic tools, potentially weighted, or, as a replacement, only to the lowest of those values.

The HrdScn function 35 may invoke a memory inspection sub-function, or RAMScn function 43, adapted to enter the inputs of the 'RAM' branch of the 'hardwareconfig' object. This RAMScn function 43 is for example arranged to invoke the "dmidecode" program [http://www.nongnu.org/dmidecode/], operating under the GNU/Linux operating system, and capable of returning the necessary information to enter said inputs. The values associated with the inputs in question may also be recovered from the management system of the BIOS, or SMBIOS, and so-called "DMI" (Desktop Management Interface) tables, directly, or using a tool different from "dmidecode."

The HrdScn function 35 may invoke a CPU inspection sub-function, or CPUScn function 45, adapted to enter the inputs of the 'CPU' branch of the 'hardwareconfig' object. This CPUScn function 45 is for example arranged to consult the "cpuinfo" input of the pseudo-file system of the GNU/Linux operating system, which contains the information on the processors of the computer, and enter said inputs. Similar programs may be used, as a replacement or supplement, for example the "cpuinfo" program operating under the Microsoft Windows operating system (registered trademarks).

The HrdScn function 35 may invoke a bus inspection sub-function, or PCIScn function 47, adapted to enter the inputs of each 'PCIBus' branch of the 'hardwareconfig' object. This PCIScn function 47 is for example arranged to invoke the "dbus" system.

The HrdScn function 35 may invoke a network interface inspection function, or NICScn function 49, adapted to enter the inputs of each 'NIC' branch of the 'hardwareconfig' object. This NICScn function 49 is for example arranged to invoke the "ethtool" program [http://www.freshmeat.net/projetcs/ethtool] and/or the "ifconfig" UNIX command, operating under the GNU/Linux operating system, and capable of returning the necessary information to enter said inputs. Similar programs may be used, as a replacement or supplement of "ethtool" and "ifconfig," in particular when the operating system of the local host computer is different from GNU/Linux.

Figure 8:
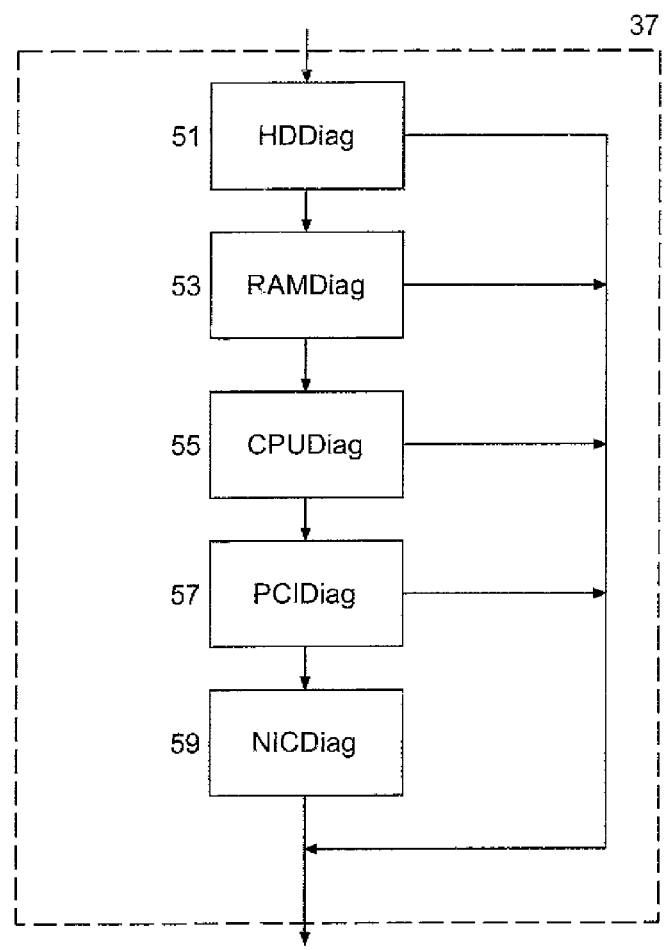
FIG. 8 shows a flowchart illustrating the operation of a hardware diagnostic function for the hardware configuration function of FIG. 5.

Reference is made to FIG. 8.

The HrdDiag function 37 is arranged to receive an object of the 'hardwareconfig' type as input and to deliver, as output, a first predictive value of the transmission/reception bandwidth limit Rhardware according to the formula of Annex A.1.1. In this formula:

Bdisk corresponds to a first predictive value of the transmission/reception limit, established taking into account the configuration of the hard disks 21 of the local host computer. The value of Bdisk is established exclusively from intrinsic characteristics and configuration parameters of said hard disks 21, here taken from the values associated with the inputs of each 'Harddrive' branch of the 'hardwareconfig' object.

Bram corresponds to a second predictive value of the transmission/reception bandwidth limit, established taking into account the configuration of the RAM 15. The value of BRAM is established exclusively from intrinsic characteristics and configuration parameters of said RAM 15.

Bcpu corresponds to a third predictive value of the transmission/reception bandwidth limit, established taking into account the configuration of the CPU processing units 13. This value of Bcpu is established exclusively from intrinsic characteristics and configuration parameters of said CPU processing units 13.

Bpci corresponds to a fourth predictive value of the transmission/reception bandwidth limit, established taking into account the configuration of the PCI bus 19. This value is established exclusively from intrinsic characteristics and configuration parameters of said bus 19.

Bnic corresponds to a fifth predictive value of the transmission/reception bandwidth limit, established taking into account the configuration of the NIC 17. This value is established exclusively from intrinsic characteristics and configuration parameters of the NIC 19.

The value associated with the first bandwidth limit value Rhardware, as returned by the HrdDiag function 37, here assumes the value of the smallest of the values of the group made up of Bdisk, Bram, Bcpu, Bpci and Bnic.

The value Rhardware is thus established according to predefined rules for comparing the set of threshold limit values Bdisk, Bram, Bcpu, Bpci and Bnic.

Different comparison rules may be considered to replace the formula of Annex A.1.1. For example, it is possible to compare these predictive values two by two, starting with the predictive value one imagines to be most critical.

The Rhardware value represents the maximum bandwidth that can be obtained with a given hardware configuration of the local host computer. This maximum bandwidth value corresponds to the smallest of the bandwidth values at the potential bottlenecks that are the hardware elements making up the local host computer. This is a forecast value, given that it is calculated before initiating the considered data transfer. This value is established exclusively from configuration data and technical characteristics related to the hardware of the computer on which the configuration agent 23 is run. These values here are obtained directly from the local computer without any other user intervention. Of course, such an intervention could be provided, alternatively, in certain very specific cases, for example to measure the effect of a characteristic on the limitation of the bandwidth, without, however, at least at first, modifying the hardware configuration of the local computer.

In the case where a memory-to-memory transfer is considered, and not disk-to-disk, the value of Bdisk is ignored for application of the formula of Annex A.1.1.

This Rhardware value constitutes a transmission/reception limit reference value. This value may serve as basis for later optimization operations. In the case where one of the limit values could not be estimated, the HrdDiag function 37 and HrdCfg function 25 can be arranged to transmit a message for the user. In that case, the formula of Annex A.1.1. is modified to take into account only the available values, or to substitute an estimated value for a value that is impossible to calculate.

The formula of Annex A.1.1. does not take into account parameters such as the current workload of the CPUs 13 or PCI bus 19, given that these parameters are by nature likely to vary by wide margins over time. Relevantly taking these parameters into account would require that they be measured in real time, which is counter to any forecast of a bandwidth limit value. In a certain way, not taking these parameters into account is also an important innovative element of the proposed configuration tool.

The HrdDiag function 37 may invoke a disk diagnostic function, or HDdiag function 51, arranged to deliver a value Bdisk delivered as output established according to the formula of Annex A.1.2., where
- speed(HD) represents a maximum achievable disk speed value for a considered disk among the disks HD of the local host computer, and
- speed(controller) represents a maximum achievable speed value for one of the disk controllers of the local host computer.

The value associated with Bdisk by the HDdiag function 51 is the sum, over all of the disk controllers of the first computer 3, of the smallest of the speed values of the group made up of the value of the speed of a considered disk controller and the sum of these speed values of the sets of disks connected to the controller. The value associated with Bdisk therefore takes into account the possibility that the data transfer bandwidth may be limited by the speed of the HD disk controller(s) 21.

For each disk HD, identified by the input 'name' in the 'hardwareconfig' object, the value associated with speed (HD) is equal to the smallest of the values associated with the 'readspeed' and 'writespeed' inputs in the 'HardDrive' branch of the disk in question in the 'hardwareconfig' object. Alternatively, the value associated with speed(HD) could be an average of the values associated with the 'readspeed' and 'writespeed' inputs, potentially weighted, or one, predetermined, of those two values.

In this embodiment, the HDdiag function 51 does not distinguish the speed of a disk during the write operation from that during a read operation. This choice is consistent in that it generally simplifies the programming of the HDDiag function 51 and the gap separating these two speed values is very small for the current disks.

Alternatively, the HDDiag function 51 may be modified so as to distinguish these read and write operations. This may be particularly interesting if the gap between the read and write speeds were to become too large, for example due to a new disk technology.

In that case, the value associated with speed(HD) could be the write speed of the disk ('writespeed') when the disc is on the receiving computer, and the read speed of the disk ('readspeed') when the disk is located on the source computer.

For each of the controllers, the value associated with speed (controller) by the HDdiag function 51 corresponds to the theoretical bandwidth associated with the value of the 'mode' input of the hard disks attached to the controller in question in the 'hardwareconfig' object.

The values that may be associated with the 'mode' input currently include PIO, DMA, UDMA, SCSI and SATA.

The associated speed values may be found in appendix A.3.1.

The Bdisk value makes it possible to predict whether bottlenecks exist related to the speed of the hard disks and the speed of the controllers to which these disks are attached. The HrdDiag function 37 may invoke a memory diagnostic function, or RAMdiag function 53, arranged to deliver, as output, a Bram value established pursuant to the formula of Annex A.1.3., where
- Data Width represents the size of the word that can be written in the RAM in a single operation, i.e. the width of the memory bus.
- FrequencyRam represents the operating frequency of the RAM, expressed in number of read/write cycles that may be performed per unit of time. This value may be obtained from the 'frequency' input of the CPU branch of the 'hardwareconfig' object, or read in the DMI tables.
- Naccess represents the number of accesses to the RAM 15 that are necessary to transfer a data chunk, i.e. a block of data made up of contiguous sectors of the hard disk. Here, Naccess is equal to 4.

In other words, the value associated with Bram by the HDdiag function 51 is the product of the Data Width value by the FrequencyRam value divided by the Naccess value.

The Bram value makes it possible to predict whether a bottleneck exists related to the RAM.

The HrdDiag function 37 may invoke a CPU diagnostic function, or CPUdiag function 55, arranged to deliver, as output, a value Bcpu established according to the formula of Annex A.1.4. In that formula:
- FrequencyCpu is the operating frequency of the CPU of the local host computer. This value may be obtained from the 'frequency' input of the CPU branch of the 'hardwareconfig' object, or read in the DMI tables.
- Ncpu is a size that represents the number of CPUs 13 integrated into the local host computer. The value of Ncpu can be obtained from the value associated with the 'number' input of the 'CPU' branch of the 'hardwareconfig' object.
- Ncore is a size that represents the number of cores of the CPUs 13. The value of Ncore can be obtained from the value associated with the 'corenumber' input of the 'CPU' branch of the 'hardwareconfig' object.
- MTUcoeff is a coefficient representing the influence of the value of the MTU size established in the local host computer.
- OtherCoeff is an overall coefficient representing the influence of additional parameters on the operating performance of the CPU 13 within the local host computer.

According to the formula of Annex A.1.4, the value associated with Bcpu is equal to the product of the value FrequencyCpu by the value Ncpu, Ncore, MTUcoeff and OtherCoeff.

The CPUdiag function 55 is arranged to establish the value of the coefficient MTUCoeff according to the formula of Annex A.1.5. In this formula:
- mtu represents the value of the MTU, for the CPU(s), i.e. the maximum size in bytes of the data packets that can be transmitted at one time. This value of MTU, generally negotiated between the NIC 17 and the switch/router to which this NIC is connected, can be obtained from the operating system. Here, the value of mtu can be obtained from the 'mtu' input of the 'NIC' branch of the 'hardwareconfig' object. Under the Linux system, for example, this value can also be known from the "sysfs" file system.

The MTUCoeff coefficient is thus established based on a MTU datum resulting from the operating data of the network communication interface.

According to the formula of Annex A.1.5, the MTUCoeff coefficient follows a logarithmic evolution as a function of the MTU data, between a maximum value for a maximal value of MTU and a value of approximately 0.8 for a minimal value of MTU.

The CPUdiag function 55 is arranged to establish the value of the OtherCoeff coefficient according to the formula of Annex A.1.6. In this formula:

The Napi coefficient characterizes a performance gain of the CPU 13 due to a first particular operating mode of the local host computer. In this first operating mode, the data exchanges between the CPUs 13 and the NIC 17 are done at regular intervals rather than by interrupts, i.e. interruption request. The API, called NAPI, used with the GNU/Linux kernel for example allows such operation.

A typical value of the Napi coefficient is 1.3 when the first operating mode is detected. Otherwise, the value of this Napi coefficient is set at 1. The information relative to whether the first operating mode exists can be obtained from the 'NAPI' input of the 'NIC' branch of the 'hardwareconfig' object.

The NICinterruptCoalescing coefficient characterizes a performance gain of the CPU 13 due to a second particular operating mode of the local host computer, compatible with the first operating mode. In this second operating mode, the NIC 17 waits for the arrival of several data packets, or the expiration of a predetermined time period, before issuing an interrupt request to the CPU.

A typical value of the NICinterruptCoalescing coefficient is 1.3 when the second operating mode is detected. Otherwise, the value of this NICinterruptCoalescing coefficient is set at 1.

The information relative to whether this second operating mode has been activated may be obtained from the 'coalescing' input of the 'NIC' branch of the 'hardwareconfig' object.

The NICcomputingOffload coefficient characterizes a performance gain of the CPUs 13 due to a third operating mode of the host computer, compatible with the first and second operating modes. In this operating mode, part of the TCP stack is offboarded from the RAM 15 to the memory of the NIC 17. This in particular involves the parts of the stack related to the integrity verification ("checksum") and the fragmentation of the data into packets.

The value of this NICcomputingOffload coefficient is comprised between 1.05 and 1.1 when the third operating mode is detected. Otherwise, the value of this NICcomputingOffload coefficient is set at 1. Different values for this NICcomputingOffload coefficient may be taken for the write and read operations.

The information relative to whether this third operating mode has been activated may be obtained from the 'coalescing' input of the 'NIC' branch of the 'hardwareconfig' object.

The DMA coefficient characterizes a performance gain of the CPUs due to a fourth operating mode of the host computer, compatible with the first, second and third operating modes. In this fourth operating mode, the local host computer operates according to the DMA ("direct access memory") standard, i.e. the CPUs are not sought during a read, then write operation on the disc. A typical value of this coefficient is 1.25, when such an operating mode is detected and the transfer is done from the hard disk of the source computer to the hard disk of the recipient computer. When the data transfer is done from the RAM 15 of the source computer to the RAM 15 of the receiving computer, the DMA coefficient is equal to 1, i.e. this fourth operating state is not taken into account.

The information relative to whether this fourth operating mode is activated can be obtained from the 'DMA' input of the 'HardDrive' branch of the 'hardwareconfig' object.

The CPUdiag function 55 is thus adapted to establish a general data transmission/reception limit value, as the product of the values FrequencyCpu, Ncpu, and Ncore, established exclusively from hardware configuration data of the processing units, and to establish, as Bcpu value, this general data transmission/reception limit value adapted using the specific MTUcoeff and OtherCoeff coefficients, established from configuration or operating data of the network communication interface.

The value Bcpu makes it possible to predict whether a bottleneck exists related to the CPUs. This value is more particularly important with very high bandwidth networks, since the influence of the processing capacities can no longer be neglected faced with the capacities of the network connection.

The HrdDiag function 37 may invoke a bus diagnostic function, or PCIdiag function 57, arranged to deliver, as output, a value of BPCI established according to the formula of Annex A.1.7 in the case where the PCI bus 19 is of the PCI or PCI-X type, and the formula of Annex A.1.8 in the case where this PCI bus 19 is of the PCI-Express type. In these formulas:

Data Width represents the size of the word that can be written at one time in the bus, i.e. the width of the PCI bus.

FreqencyPci represents the operating frequency of the PCI bus, which can be obtained from the 'hardware config' object.

The PCIcoeff coefficient takes into account the operating mode of the PCI bus 19 in question, i.e. primarily in full-duplex or half-duplex mode.

The quantity Nlanes represents the fixed number of lines of the PCI Express bus considered.

The speed (lane) value represents the individual speed of each of said lines.

The value of PCIcoeff is equal to 0.5 in the case where the PCI bus 19 is of the PCI or PCI-X type, and 0.8 when said bus is of the PCI-Express type.

The type of the PCI bus 19 can be recovered from the value associated with the 'type' input of the 'CI Bus' branch of the 'hardwareconfig' object.

The HrdDiag function 37 can invoke a network controller diagnostic function, or NICDiag function 59, arranged to deliver, as output, a value of Bnic established according to the formula of Annex A.1.9. In this formula:

The quantity speed (NIC) represents the speed of the considered NIC 17. This value can be obtained from the value associated with the 'speed' input of the 'NIC' branch of the 'hardwareconfig' object, and The MTUcoeff coefficient represents the bandwidth overload that results from the data link, network and transfer protocols used, relative to the quantity of data that must be transferred from the first computer 3 to the second computer 5.

The NICDiag function 59 is arranged to establish a value of the MTUcoeff coefficient according to the formula of Annex A.1.10, where the quantity MTU represents the value of MTU, mentioned above.

Figure 9:
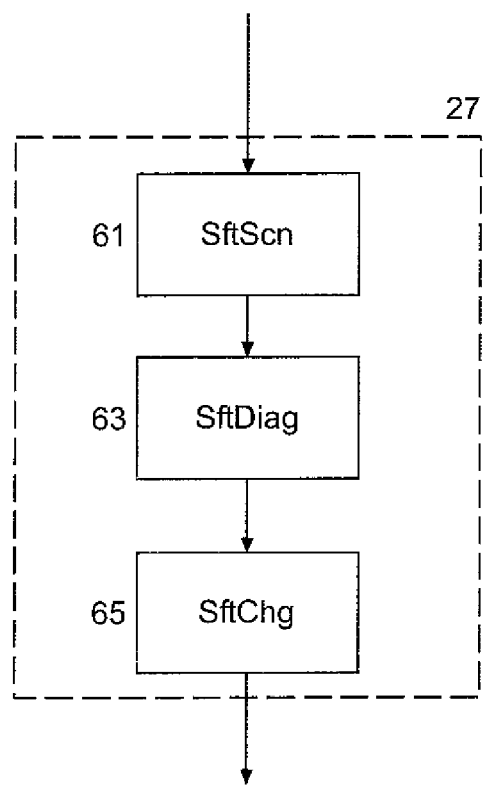
FIG. 9 shows a flowchart illustrating the operation of a software configuration function of the local agent of FIG. 4.

Reference is made to FIG. 9.

The SftCfg function 27 is arranged to invoke a software inspection function, or the SftScn function 61, adapted to recover the values of a set of characteristic parameters of the software configuration of the local host computer, then a software diagnostic function, or SftDiag function, 63, adapted to establish a second transmission/reception bandwidth limit reference value, related to the software configuration of the host computer, Rsoftware, using values from the set of parameters established by the SftScn function 61 then, optionally, a configuration modification function, or SftChg function 65, adapted to generate a modified software configuration from the set of parameters established by the SftScn function 61.

Figure 10:
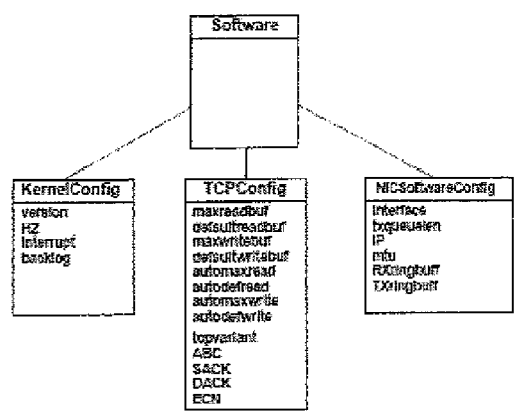
FIG. 10 shows a diagram of a software configuration object.

FIG. 10 shows one advantageous illustration of a set of parameters in question, in the form of a computer object of the software configuration, or 'softwareconfig,' type.

An object of the 'softwareconfig' type has a tree structure including a 'KernelConfig' node, bringing together the parameters related to the configuration of the kernel of the operating system of the local host computer, a 'TCPConfig' node, bringing together the parameters related to the operation of the TCP stack in that local host computer, and a 'NICSoftwareConfig' node, bringing together the parameters related to the steering of the NIC 17 in the local host computer.

A 'KernelConfig' branch includes a 'version' input, with which an identifier of the version of the kernel of the operating system can be associated, an 'HZ' input, with which a characteristic value of the scheduler of that node can be associated, an 'Interrupt' input, with which a maximum interrupt request level value to be managed by the CPUs 13 can be associated, and a 'Backlog' input, with which a value representing the maximum size of the processing queue of said CPUs 13 can be associated.

A 'TCPConfig' branch includes a 'maxreadbuffer input, with which a maximum size value of the TCP read buffer can be associated, a Defaultreadbuffer' input, with which a default size value of that buffer can be associated, a 'maxwritebuffer' input, with which a maximum size value of the TCP write buffer can be associated, a 'defaultwritebuffer' input, with which a default size value for that buffer can be associated, an 'automaxread' input, with which a maximum size value for automatic adjustment of the TCP read buffer can be associated, an 'autodefread' input with which a default size value for that buffer can be associated, an 'automaxwrite' input, which with a maximum size value for the automatic adjustment buffer of the TCP write buffer can be associated, an 'autodefwrite' input, with which a default size value for that buffer can be associated, a 'TCPVariant' input, with which an identifier of the version of the TCP protocol can be associated, an 'ABC' input, of the Boolean type, which indicates a particular configuration of the TCP stack in which the actual quantity of bytes of data carried out is counted rather than the packets carried out to update the quantity of data that can be sent by the source computer at a given moment (rfc 3465), a 'DACK' input, with which a value indicative of the transmission by the local host computer of a delayed return receipt can be associated, a 'SACK' input, with which a value indicating a selective return receipt transmission can be associated, and an 'ECN' input, of the Boolean type, which represents a configuration of the TCP stack of the transmitter in which the latter is capable of taking into account the notifications transmitted by the intermediate network equipment, in particular signaling congestion or a risk of congestion.

The 'IC SoftwareConfig' branch includes a 'txqueuelen' input, with which a transmission queue size value of the NIC 17 can be associated, a 'MTU' input, with which a size value of the MTU can be associated, a 'Txringbuff' input, with which a size value of the transmission buffer can be associated, and a 'Rxringbuff' input, with which a size value of the receiving buffer can be associated.

Figure 11:
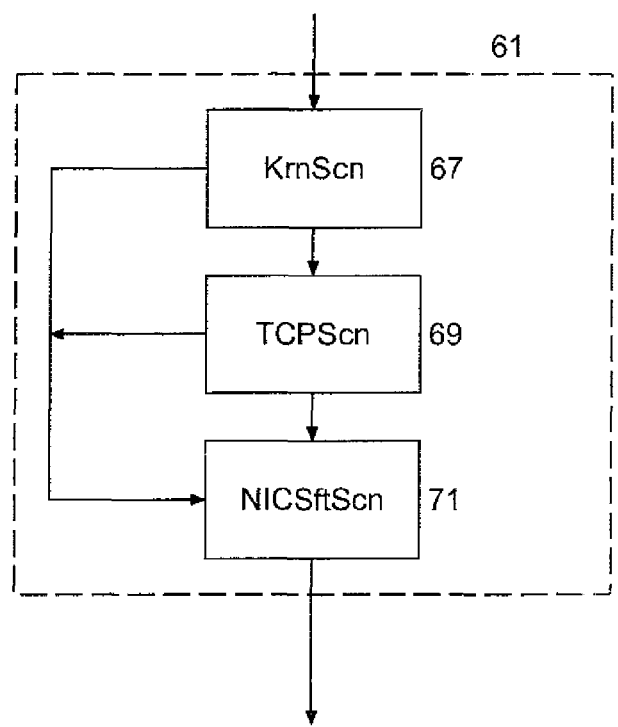
FIG. 11 shows a flowchart illustrating the operation of a software inspection function for the software configuration function of FIG. 9.

Reference is made to FIG. 11.

The SftScn function 61 is arranged to receive an object of the 'softwareconfig' type as input and to deliver an object of the 'softwareconfig' type having inputs filled in as output.

The SftScn function 61 can be arranged to call of an inspection function of the kernel, or KrnScn function 67, adapted to fill in the inputs of the 'KernelConfig' branch of the 'SoftwareConfig' object. The KrnScn function 67 can be arranged to invoke the "procfs" pseudo-file system of the GNU/Linux operating system, which is capable of exporting information from the kernel on the processes, which makes it possible to fill in said inputs.

The SftScn function 61 can also be arranged to invoke a TCP stack inspection function, or TCPScn function 69, adapted to fill in the inputs of the 'TCPConfig' branch of the 'softwareconfig' object. The TCPScn function 69 can be arranged to call "procfs," mentioned above and capable of returning the necessary information to fill in said inputs.

The SftScn function 61 can be arranged to invoke a network driver inspection function, or NICSftScn function 71, adapted to fill in the inputs of the 'NICSoftwareConfig' branch of the 'softwareconfig' object. The NICSftScn function 71 can be arranged to invoke the "sysfs" pseudo-file system of the GNU/Linux operating system, which is capable of returning information on the drivers and the hardware of the core to the user space and filling in the values to be associated with the 'Txqueuelen' and 'MTU' inputs and the "ethtool" program, also operating in the GNU/Linux operating system, to fill in the 'TXringbuff' and 'RXringbuff' inputs.

Figure 12:
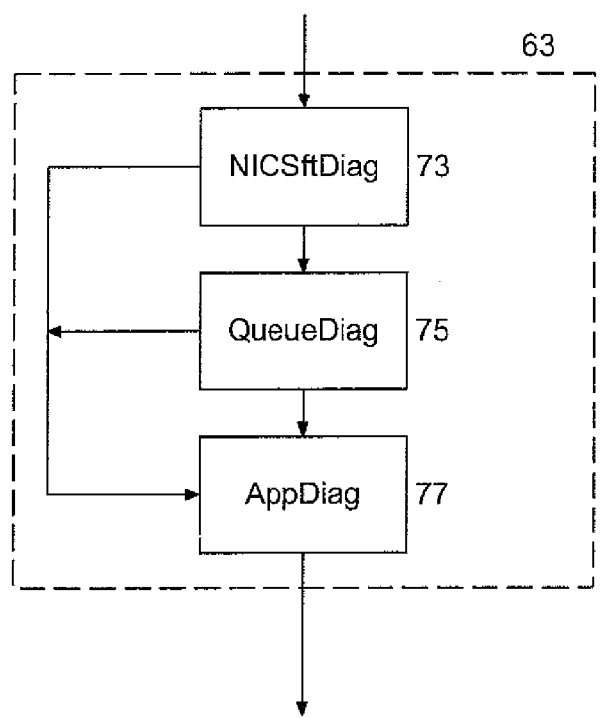
FIG. 12 shows a flowchart illustrating the operation of SftDiag function.

Reference is made to FIG. 12.

The SftDiag function 63 is arranged to receive an object of the 'SoftwareConfig' type as input and deliver the Rsoftware value as output.

The SftDiag function 63 is arranged to establish the Rsoftware value according to the formula of Annex A.2.1. In that formula:

Bnic corresponds to a sixth predictive value of the data transmission/reception bandwidth limit taking into account the configuration of the driver of the NIC 17 of the host computer, in particular the quantity of data it is possible to have pass through the buffer of that controller.

Bqueue corresponds to a seventh predictive value of the data transmission/reception bandwidth limit established taking into account the configuration of the kernel of the operating system, in particular the bandwidth that can be achieved when the kernel copies data packets from the software queue of the CPUs 13 intended for the buffer of the TCP stack or from the buffer of that TCP stack to the transmission queue when the local host computer is the source computer.

Bapplication represents a value of the application, in particular, the maximum data transfer speed that the application used for the transfer is capable of reading or writing in the TCP buffer during the transfer, this value being able to be determined by the quantity of data "pushed" on the network 7.

The value associated with Rsoftware, returned by the Sft-Dig function 63, here assumes the value of the smallest of the values of the group made up of the values of Bnic, Bqueue and Bapplication. It is thus established according to predefined rules from these predictive limit values.

The local agent makes it possible to obtain a second bandwidth limit reference value, which characterizes all of the software elements operating during a data exchange through a network. As it is established here, this second reference value effectively characterizes a bottleneck related to the software elements of the computers involved in a data exchange through the network. This second reference value can be compared to other bandwidth values. In particular, the second reference value can be compared to the first reference value. This in particular makes it possible to determine whether it is relevant to seek improvements in the software configuration of the computer in question: this will not be the case, for example, when the second reference value is higher than the first reference value (because the bandwidth is then limited by the hardware configuration of the computer), or when the second reference value of the local computer is higher than the second reference value of the remote computer (the software configuration improvements will then need to be sought on said remote computer).

As for the first reference value, the Applicant has succeeded in identifying all of the software elements capable of influencing the actual bandwidth of the data exchange. Due to the quantities taken into account, this second reference value is practically independent of the hardware configuration of the host computer.

Each of the predictive values Bnic, Bqueue, Bapplication is characteristic of the influence of a software element considered independently of the others. In other words, the Applicant has managed to isolate the relevant software elements and characterize their influence in a data transfer.

The value Rsoftware represents the maximum bandwidth that may be obtained with a given software configuration of the local host computer.

The SftDiag function 63 can invoke a software diagnostic function of the NIC 17, or NICSftDiag function 73, arranged to deliver, as output, a value Bnic established according to the formula of Annex A.2.2. In this formula:
BufferRing represents a value of the buffer of the NIC 17.
InterruptRate is a value representing the interrupt request rate that the kernel of the operating system can process. This value can be obtained from the value associated with the 'Interrupt' input of the 'KernelConfig' branch of the 'SoftwareConfig' object.
MTU corresponds to a standardization coefficient intended to convert the values obtained from the kernel of said operating system into bytes, rather than data packets. Typically, MTU is equal to 1500 multiplied by 8 divided by 1,000,000, i.e. corresponds to the conversion into megabytes per second of the value of MTU used in the Ethernet frames.

The value associated with BufferRing differs depending on whether the considered buffer is that of the transmission or reception. The formula of Annex A.2. in reality includes two formulas depending on whether the local host computer is acting as transmitter or receiver in the disk-to-disk data transfer.

The value of the BufferRing in question may be obtained from the values respectively associated with the 'TXringbuff' and 'RXringbuff' inputs in the 'NICSoftwareConfig' branch of the 'SoftwareConfig' object.

The SftDiag function 63 may invoke a queue diagnostic function, or QueueDiag function 75, adapted to deliver, as output, a value of Bqueue established according to the formula of Annex A.2.3., in the case where the local host computer acts as receiver in the disk-to-disk data transmission, and according to the formula of Annex A.2.4. when the local host computer acts as transmitter in that data transmission. In these formulas:
Backlog represents the maximum size of the processing queue of the CPUs 13. This value can be obtained from the value associated with the 'Backlog' input of the 'KernelConfig' branch of the 'SoftwareConfig' object.
HZ corresponds to the minimum granularity of the scheduler of the kernel of the operating system of the local host computer. This value can be obtained from the value associated with the 'HZ' input of the 'KernelConfig' branch of the 'SoftwareConfig' object.
MTU is a value similar to the MTU value of figure A.2.2.
TXQueueLen is a value that represents the size of the transmission queue of the software portion of the NIC 17. This value can be obtained from the value associated with the 'TXQueueLen' input of the 'NICSoftwareConfig' branch of the 'SoftwareConfig' object.

The value associated with HZ makes it possible to have an estimate of the number of elementary tasks that the kernel of the operating system can perform per unit of time. An elementary task may be copying data from the queue of the kernel to the buffer memory of the application. This is an upper limit.

The SftDiag function 63 can invoke an application diagnostic function, or AppDiag function 77, arranged to deliver, as output, a value Bapplication established according to the formula of Appendix A.2.5. In this formula:
BufferTCP represents the size of the buffer memory of the TCP stack, considered in read or write depending on the role played by the local host computer in the disk-to-disk data transmission. This value can be obtained respectively from the values associated with the 'maxreadbuffer' and 'maxwritebuffer' inputs of the 'TCPConfig' branch.
'RTT' represents the average round-trip time for a data packet between the source and the destination, said time value being able to be obtained by running a "ping"-type request.

The SftChg function 65 is arranged to receive, as input, a 'SoftwareConfig' object and to generate a modified 'SoftwareConfig' object. This modified object is determined so as to define a software configuration adapted to achieve a target value of RTT. The SftChg function 65 is arranged to receive at least some of the following arguments:
a Boolean indicating whether the local computer is the source computer or the receiving computer,
an identifier of the interface of the NIC 17 concerned by the transfer, for example in the form of a chain of characters,
a target value of RTT for the path between the first computer 3 and the second computer 5 for example expressed in milliseconds by a floating integer,
a target bandwidth rate, as desired by the user, for example expressed in megabytes per second,
a computer file identifier where the new configuration is to be written. The old configuration can also be saved so as to prevent any problems.

The target bandwidth value can for example assume the value of the first limit bandwidth reference value, in particular when the second bandwidth limit reference value established by the SftCfg function 27 is smaller than the first reference value.

By default, it is possible to consider that the transmitter is such that a transfer is possible at approximately 100 milliseconds and target speed of 1000 megabytes per second.

Here, the SftChg function 65 is arranged so as to modify the values of the inputs relative to the size of the buffer memory of the TCP stack, the 'txqueuelen' input relative to the transmission queue size of the NIC 17, the 'Backlog' relative to the maximum size of the processing queue of the CPUs 13 and the 'Txringbuff' and "Rxringbuff" inputs relative to the size of the transmission/reception buffer. The values associated with the 'RTT,' 'MTU' inputs as well as the target bandwidth are, on the contrary, fixed.

The values of the modified inputs are injected into formulas A.2.5 to A.2.2 so as to establish an optimized software configuration. Lastly, the extent to which these sizes are modified depends on the target bandwidth set by the user. These changes do not require any new compilation of the kernel.

Additionally, the value associated with the 'HZ' input can also be modified, a new compilation of the kernel then being provided.

The call on the SftChg function 65 by the SftCfg function 27 may be systematic or conditional. For example, the SftChg function 65 can be arranged to invoke the SftCfg function 27 only when the first bandwidth limit reference value is higher than the second bandwidth limit reference value, or in other words, when the software configuration of the local host computer limits the foreseeable bandwidth in light of the bandwidth allowed by the hardware configuration of that computer.

Figure 13:
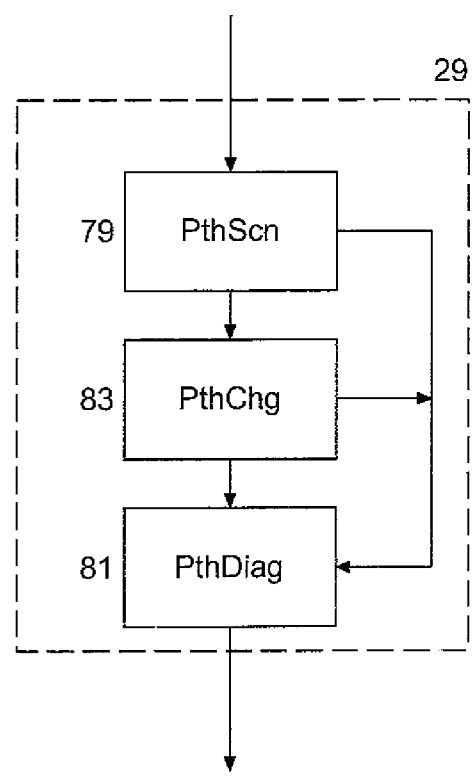
FIG. 13 shows a flowchart illustrating the operation of PthCfg function.

Reference is made to FIG. 13.

The PthCfg function 29 is arranged to invoke a network inspection function, or PthScn function 79, adapted to recover a set of characteristic parameters of the connection between the first computer 3 and the second computer 5, then a network diagnostic function, or PthDiag function 81, adapted to establish a transmission/reception bandwidth limit value taking into account the configuration of the Rnetwork network using a set of parameters established by the PthScn function 79.

Figure 14:
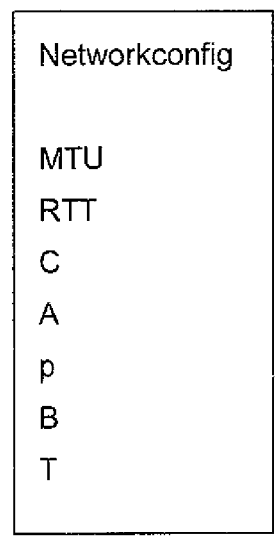
FIG. 14 shows a set of parameters recovered by PthScn function.

FIG. 14 shows one advantageous illustration of a set of parameters in question, in the form of a computer object of the network configuration, or "networkconfig," type.

An object of the 'networkconfig' type has a list structure including an 'MTU' input, with which the value of MTU negotiated between the NIC 17 and the corresponding access point can be associated, an 'IRTT' input, a 'C' input, with which a capacity value related to the bottleneck of the network 7 can be associated, an 'A' input, with which an available bandwidth value can be associated, a 'p' input with which a data loss rate value can be associated, a 'B' input, with which a maximum buffer memory space value at the network bottleneck can be associated, and a 'T' input, with which a value of the time necessary to perform a transfer of a predetermined quantity of bytes can be associated.

The PthScn function 79 is arranged to recover a 'networkConfig' object as input and to return, as output, an object of that type with the associated values.

The PthScn function 79 initiates an elementary transfer of a quantity of V bytes, for example using the "iperf" program [http://sourceforge.net/projets/iperf/], which makes it possible to obtain an estimate of the minimum time needed to perform a transfer of a quantity V of data.

The PthScn function 79 can be arranged to call the "ifconfig" or "ethtool" system tools, which are capable of providing an estimated value of the MTU.

The PthScn function 79 can also be arranged to execute a "ping" command, which makes it possible to obtain a value associated with the 'IRTT' input.

This function can also be arranged to invoke the "pathload" program [http://www.cc.gatech.edu/fac/constantinos.dovro-lis/bw-est/pathload.html], available on the GNU/Linux operating system, and capable of returning certain characteristics of the network, such as the available bandwidth or the capacity of the bottleneck, which makes it possible to obtain the values to be associated with inputs 'C' and 'A'.

The PthScn function 79 can be arranged to use, optionally, the "web100" library [http://www.web100.org/], which makes it possible to intercept the evolution of the variables of the TCP stack in the GNU/Linux system, or the "netstat" Unix command to obtain a value to be associated with the 'B' input.

Lastly, this PthScn function 79 can be arranged to invoke the "iperf" program, available on the GNU/Linux operating system, to obtain the necessary data to be associated with the 'T' input.

To date, the use of "web100" is favored. Other choices may prove interesting, in particular depending on the software available on the source and receiving computers.

The PthDiag function 81 is arranged to return, as Rnetwork value, the smallest value from the group consisting of 'C', 'A' and 'V/T'.

The PthDiag function 81 thus establishes a third transmission/reception bandwidth limit value as a function of the values of 'C', 'A' and 'V/T' from pre-established rules. This third reference value characterizes the influence, in a data transfer, of the characteristics of the network connection between the host computer and the remote computer. As it is established, this third reference value can be compared to other bandwidth values. In particular, the third reference value can be compared to the first reference value and/or the second reference value.

Here, the PthCfg function 29 is also arranged to invoke a network connection optimization function, or PthChg function 83. Calling on said PthChg function 83, which is optional in any case, may be systematic or conditional. The PthCfg function 29 can for example invoke the PthChg function 83 only when the third reference value is lower than both the first reference value and the second reference value. This amounts to optimizing the network connection only in the case where an overall bandwidth gain is sought, i.e. when, furthermore, that bandwidth is not limited by the software and hardware configuration of the local and/or remote computer.

The PthChg function 83 is arranged to call repetitively on the "iperf" program to send the same quantity of data 'V', each time divided into a different number of connections. After each execution of "iperf," the PthChg function 83 calls on the PthDiag function 81 to obtain a corresponding Rnetwork estimate. The PthChg function 83 thus establishes the number of parallel currents that leads to the best performance on the network 7.

The PthChg function 83 is also arranged to call repetitively on the "iperf" program with the same quantity V of data using different variations of the 'TCP' protocols available on the system. Each execution of "iperf" is followed by a call for the PthDiag function 81 to obtain a corresponding Rnetwork estimate. The PthChg function 83 thus determines the variation with the best performance. The PthChg function 83 can be arranged to modify the alternative of the TCP congestion control used in the kernel and to verify the performance obtained.

In one particular embodiment, at least one of the first computer 3 and the second computer 5 assumes the form of a box that can be administered remotely, for example through the data exchange network. In this embodiment, a new kernel, recompiled with the optimal software configuration, is recharged remotely.

In another particular embodiment, the configuration tool 23 is implemented in the form of a service. This tool can then be used in combination with a bandwidth reservation system to reserve just the bandwidth quantity necessary for the transfer between the first computer 3 and the second computer 5. This avoids reservations of a bandwidth quantity not attainable by those computers.

The tool described above makes it possible first to obtain a predictive data transfer bandwidth value, which takes into account the configuration of the hardware and software elements of the local and/or remote computers, as well as the characteristics of the network connection between said computers. It then makes it possible to obtain a diagnostic on the elements of a nature to constitute a bottleneck during the actual transfer. It also offers possibilities for optimizing these elements and the connection. Lastly, it makes it possible to optimize the data transfer conditions, even before initialization of the transfer in question. This is very important when the transfer relates to a large quantity of data, with the result that even a small variation in the bandwidth has significant time-related consequences.

Certain predictive bandwidth values take into account the characteristics of the considered transfer, as well as certain optimizations proposed by the tool in question. Other predictive values, like that characterizing the hardware configuration of the computer, are independent of the characteristics of the considered transfer.

The invention is not limited to the embodiments described above, provided solely as an example, but on the contrary encompasses all alternatives that one skilled in the art may consider, and in particular:

- Although the diagnostic tool has been described relative to the TCP/IP transmission/network protocol, it may be adapted to operate with any other protocol, in particular based on a data transfer in packets. In the latter case, only the formula of Annex A.1.10 must be adapted to the characteristics of the chosen protocol.
- Although the SftCfg function 27 has been arranged to take into account the characteristics of the kernel of the operating system, this does not rule out modifying that function so that it takes into account the configuration of other software, operating during a data transfer, inasmuch as the configuration of that software has an actual influence on the data transfer bandwidth and that influence can be evaluated relevantly, i.e. in particular can be evaluated in a manner allowing it to be compared to the other reference values.
- As a function of infrastructure, hardware, software and/or network evolutions, the diagnostic tool may be modified so as to take the evolution in question into account, which may amount to periodic modifications of some of the described formulas, by adding or removing predictive bandwidth value computation functions, by adding or eliminating diagnostic functions, or by adding or removing optimization functions.
- The formulas described and implemented in the different functions of the diagnostic tool have been established so as to account for the respective influence, in a data transfer, of different hardware, software, and network connection elements. These formulas are such that they allow a relevant comparison of the respective influence of these elements and the network connection. For all that, this does not rule out that at least some of these formulas may be modified in the future, for example to still more precisely take into account the influence of one particular element or an additional element. For example, it would be possible to account for how the CPUs 13 interact with the RAM as a function of the very architecture of those CPUs.

Optional, complementary or replacement characteristics of the invention have been described, in particular:

The tool also includes a software configuration modification function capable of actively modifying at least some of the data from among the group consisting of the network interface buffer memory configuration data, TCP queue configuration data, and data transfer application configuration, and the local agent is arranged so as, when called upon, to receive a data transmission or reception bandwidth limit target value, to invoke the software diagnostic function and to call on the configuration modification function in the case where the second reference value is below said target value.

The local agent also includes a ninth function adapted to establish a ninth predictive value of the data transmission or reception bandwidth limit from network path performance data, and is arranged so as, upon prior call for a data transfer, to launch the ninth function and return a third data transmission or reception bandwidth reference value as size of interest in connection with said data transmission or reception bandwidth reference value.

The tool also includes a remote agent that can be executed on a computer comprising random-access memory, one or more central processing units, and one or more communication interfaces with the data exchange network of the computer on which the local agent is run, the interfaces being connected to the random-access memory by means of a data transfer bus, said remote agent being similar to the local agent.

The local agent also includes a TCP protocol parameter modification function and, when invoked, initiates said parameter modification function with a predetermined set of configuration parameters, then said software diagnostic function, said second reference value being able to be compared to a data transmission or reception bandwidth target value.

Of course, the invention is applicable both in the case of physical machines (servers) and virtual machines potentially associated with a hypervisor/resource sharing mechanism between the different virtual machines and which may also puncture resources.

Annex 1 - Formulas $$Rhardware = \min(Bdisk, Bram, Bcpu, Bnic, Bpci) \quad \text{A.1.1}$$

$$Bdisk = \sum_{controller} \min\left(speed(controller), \sum_{HDcontroller} speed(HD)\right) \quad \text{A.1.2}$$

$$Bram = DataWidth^* FrequencyRam / Naccess \quad \text{A.1.3}$$

$$Bcpu = FrequencyCpu^* Ncpu^* Ncore^* MTUcoeff^* OtherCoeff \quad \text{A.1.4}$$

$$MTUcoeff = 1 - \frac{0.2}{\ln(8000) - \ln(1500)} * (\ln(8000) - \ln(mtu)) \quad \text{A.1.5}$$

$$OtherCoeff = \quad \text{A.1.6}$$
$$Napi^* NICinterruptCoalescing^* NICcomputingOffload^* DMA$$

$$Bpci = DataWidth^* FrequencyPci^* PCIcoeff \quad \text{A.1.7}$$

$$Bpci = Nlanes^* speed(lane)^* PCIEcoeff \quad \text{A.1.8}$$

-continued $$Bnic = \text{speed}(NIC) * MTUcoeff \quad \text{A.1.9}$$

$$MTUcoeff = \frac{MTU - 52}{MTU + 14 + 4 + 12 + 8} \quad \text{A.1.10}$$

Annex 2—Formulas
A.2.1
  Rsoftware=min(Bnic, Bqueue, Bapplication)
A.2.2
  Bnic=BufferRing*InterruptRate*MTU
A.2.3
  Bqueue=Backlog*HZ*MTU
A.2.4
  Bqueue=TxQueueLen*HZ*MTU
A.2.5
  Bapplication=BufferTCP*RTT Annex 3 - Numerical data
A.3.1.1

| mode | Bandwidth in Mbs |
|---|---|
| PIO | |
| pio0 | 26.4 |
| pio1 | 41.6 |
| pio2 | 66.4 |
| pio3 | 88.8 |
| pio4 | 133.3 |
| ATA DMA | |
| mdma0 | 33.6 |
| mdma1 | 106.4 |
| mdma2 | 133.6 |
| udma0 | 133.6 |
| udma1 | 200 |
| udma2 | 266.4 |
| udma3 | 355.2 |
| udma4 | 531.2 |
| udma5 | 800 |
| udma6 | 1064 |
| SATA | |
| sata-150 | 1500 |
| sata-300 | 3000 |
| sata-600 | 4800 |
| SCSI | |
| fast | 160 |
| ultra | 320 |
| ultra-2 | 640 |
| ultra-3 | 1280 |
| ultra-320 | 2560 |
| ultra-640 | 5120 |

The invention claimed is:

1. A computer tool including a local pre-transfer agent, that can be run on a local computer comprising random-access memory, one or more central processing units, and one or more communication interfaces for communicating with a data exchange network and which are connected to the random-access memory by means of a communication bus, said agent comprises:
  a first function adapted to establish a first predictive value of data transmission or reception bandwidth limit from configuration data in the random-access memory;
  a second function adapted to establish a second predictive value of data transmission or reception bandwidth limit from hardware configuration data relative to the one or more central processing units;
  a third function adapted to establish a third predictive value of data transmission or reception bandwidth limit from hardware configuration data relative to the communication bus;
  a fourth function adapted to establish a fourth predictive value of data transmission or reception bandwidth limit from hardware configuration data relative to the one or more communication interface;
  a fifth function adapted to establish a fifth predictive value of the data transmission or reception bandwidth limit, from hardware configuration data relative to permanent data storage media; and wherein, and
  a hardware diagnostic function adapted to invoke each one of said first, second, third, fourth, and fifth functions and to establish, from the resulting first, second, third, fourth, and fifth predictive bandwidth limit values, a bandwidth reference value for data transmission or reception, in accordance with predefined comparison rules for said predictive values;
  the local agent being arranged so as, upon prior call for data transfer, to launch the hardware diagnostic function and return said data transmission or reception bandwidth reference value as a quantity of interest in connection with at least one other data transmission or reception bandwidth quantity.

2. The tool according to claim 1, wherein the local agent also comprises:
  a first inspection function capable of assembling memory configuration data;
  a second inspection function capable of assembling configuration data of the central processing units;
  a third inspection function capable of assembling configuration data of a data transfer bus;
  a fourth inspection function capable of assembling of the configuration data of the network communication interface; and wherein
  the hardware diagnostic function is adapted to invoke each of these inspection functions so as to obtain a set of configuration data sets and invoke each of said first, second, third and fourth functions with, each time, at least one of these data sets.

3. The tool according to claim 1, wherein, the second function is adapted to establish a general data transmission/reception bandwidth limit value, established exclusively from hardware configuration data of the processing units, and to establish, as second transmission/reception bandwidth limit value, said general data transmission/reception bandwidth limit value adapted using one or more specific coefficients, established from configuration or operating data of the network communication interface.

4. The tool according to claim 3, wherein the specific coefficients include at least one first coefficient established based on an MTU datum from the operating data of the network communication interface.

5. The tool according to claim 4, wherein the second function is adapted to establish said first coefficient according to a logarithmic evolution as a function of said MTU datum, between a maximum value for a maximal value of MTU and a value of approximately 0.8 for a minimal value of MTU.

6. The tool according to claim 3, wherein the specific coefficients include one or more coefficients from the group comprising:
  a first performance increase coefficient when the configuration data of the interface include a datum indicating an operating mode with regular querying of the interface,
  a second performance increase coefficient when the configuration data include a datum indicating an operating mode with an accumulation of received data packets before transmitting an interrupt request, a third performance increase coefficient when the configuration data include a datum indicating an operating mode with movement of part of the TCP stack into a memory of the interface, a fourth performance increase coefficient when the configuration data include a datum indicating a DMA operating mode.

7. The tool according to claim 6, wherein the specific coefficients comprise all of the coefficients of said group.

8. The tool according to claim 1, wherein the local agent also comprises:

a sixth function adapted to establish a sixth predictive value of data transmission or reception bandwidth limit, from buffer memory configuration data of the network interface, a seventh function adapted to establish a seventh predictive value of data transmission or reception bandwidth limit, from TCP queue configuration data, an eighth function adapted to establish an eighth predictive value of the data transmission or reception bandwidth limit, from configuration data of a data transfer application, a software diagnostic function arranged to invoke each of the sixth, seventh, eighth functions, and to establish, from the sixth, seventh and eighth resulting predictive values of the bandwidth limit, a second data transmission or reception bandwidth reference value according to predefined rules for comparing said predictive values, the local agent being arranged so as, upon prior call for a data transfer, to initiate the software diagnostic function and to return said second data transmission or reception bandwidth reference value as size of interest in relation with said data transmission or reception bandwidth reference value.

9. The tool according to claim 8, also comprising a sixth inspection function capable of assembling buffer memory configuration data of the network interface, a seventh inspection function capable of assembling TCP queue configuration data, an eighth inspection function capable of assembling configuration data of the data transfer application, and wherein the software diagnostic function is adapted to invoke each of these inspection functions so as to obtain a set of configuration data sets and to invoke each of said sixth, seventh and eighth functions with, each time, at least one of these data sets.

10. The tool according to claim 8, also including a software configuration modification function capable of actively modifying at least some of the data among the group made up of the buffer memory configuration data of the network interface, TCP queue configuration data, and configuration of the data transfer application, and in which the local agent is arranged so as, when called upon, to receive a data transmission or reception bandwidth limit target value, to invoke the software diagnostic function, and to invoke the configuration modification function in the case where the second reference value is lower than said target value.

11. The tool according to claim 1, wherein the local agent also comprises:

a ninth function adapted to establish a ninth predictive value of data transmission or reception bandwidth limit from network path performance data, and wherein the local agent is adapted so as, upon prior call for a data transfer, to initiate the ninth function and to return a third data transmission or reception bandwidth reference value as quantity of interest in relation with said data transmission or reception bandwidth reference value.

12. The tool according to claim 1, also comprising a remote agent that can be executed on a computer comprising random-access memory, one or more central processing units, and one or more communication interfaces with the data exchange network of the computer on which the local agent is executed, the interfaces being connected to the random-access memory by means of a data transfer bus, said remote agent being similar to the local agent.

13. The tool according to claim 8, wherein the local agent comprises a TCP protocol parameter modification function and wherein the local agent, when called upon, initiates said parameter modification function with a predetermined set of configuration parameters, then said software diagnostic function, said second reference value being able to be compared to a data transmission or reception bandwidth target value.

* * * * *